United States Patent [19]

Warren et al.

[11] 3,711,938
[45] Jan. 23, 1973

[54] METHOD FOR PULLING, ALIGNING AND BEVELLING ADJACENT SUBMERGED PIPE SECTIONS

[75] Inventors: Bobby J. Warren; Paul K. Johnson, both of Houston, Tex.

[73] Assignee: Fluor Corporation, Los Angeles, Calif.

[22] Filed: Oct. 26, 1970

[21] Appl. No.: 83,833

[52] U.S. Cl. .................29/493, 29/428, 61/72.3, 228/5, 228/44
[51] Int. Cl. ..........................................B23p 11/00
[58] Field of Search................29/493, 401, 428, 402; 61/72.3, 72.5, 72.1, 69, 43; 228/4, 5, 6, 13, 14, 18, 28

[56] References Cited

UNITED STATES PATENTS

| | | | |
|---|---|---|---|
| 3,578,233 | 5/1971 | Meister | 29/493 |
| 3,508,410 | 4/1970 | Lynch | 61/72.3 |
| 3,658,366 | 4/1972 | Welch et al. | 61/72.3 |

Primary Examiner—Richard J. Herbst
Assistant Examiner—Daniel C. Crane
Attorney—Michael P. Breston and Alfred B. Levine

[57] ABSTRACT

This invention provides a method for pulling, aligning and bevelling the end portions of submerged pipe sections prior to welding them together. he two pipe sections are pulled together in end-to-end relationship. Then, the ends are abuttingly aligned. By repeatedly cutting both abutting edges simultaneously, the edges are made to lie in substantially parallel planes, face-to-face, to form therebetween a joint with a welding gap characterized by close tolerances.

7 Claims, 10 Drawing Figures

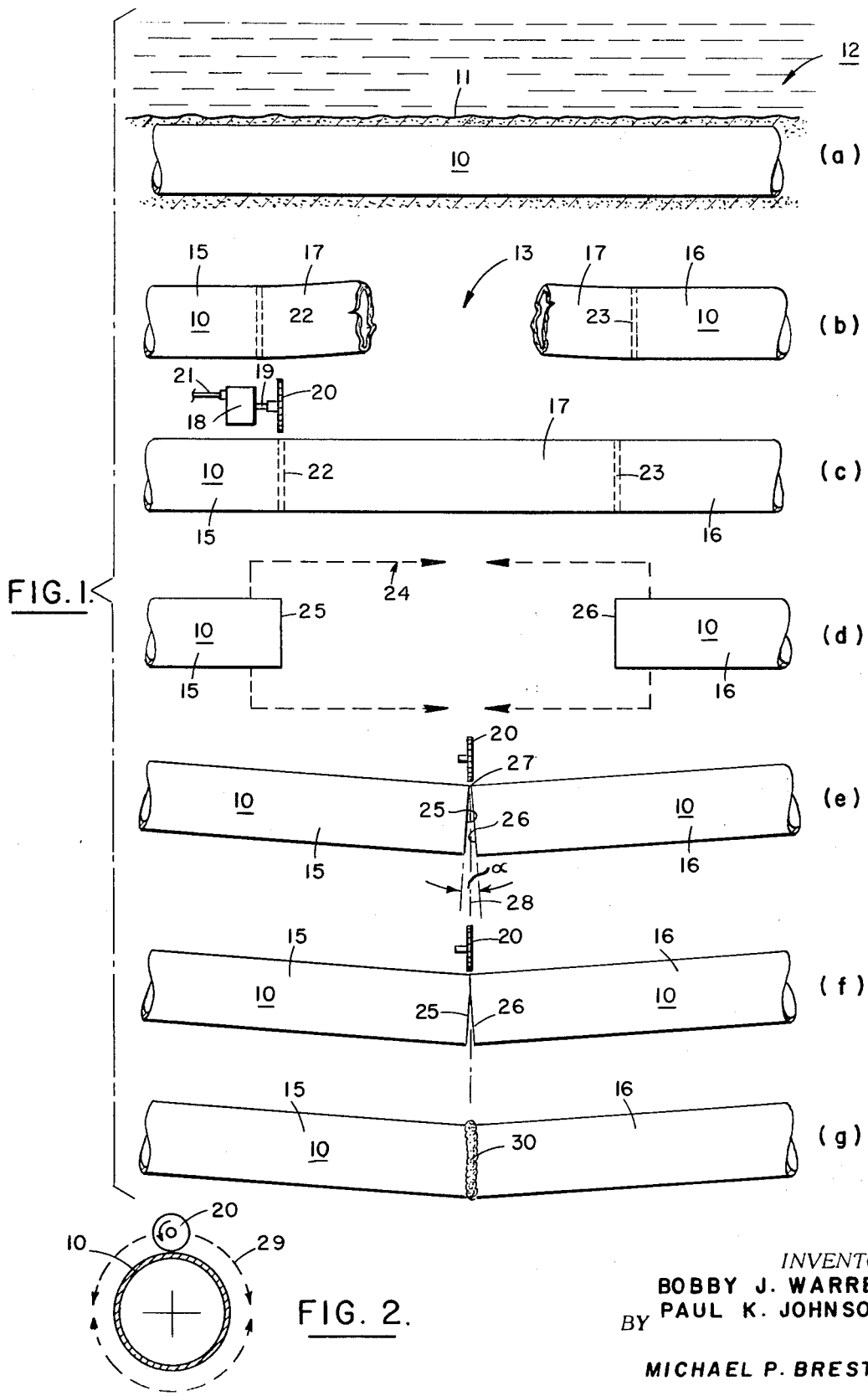

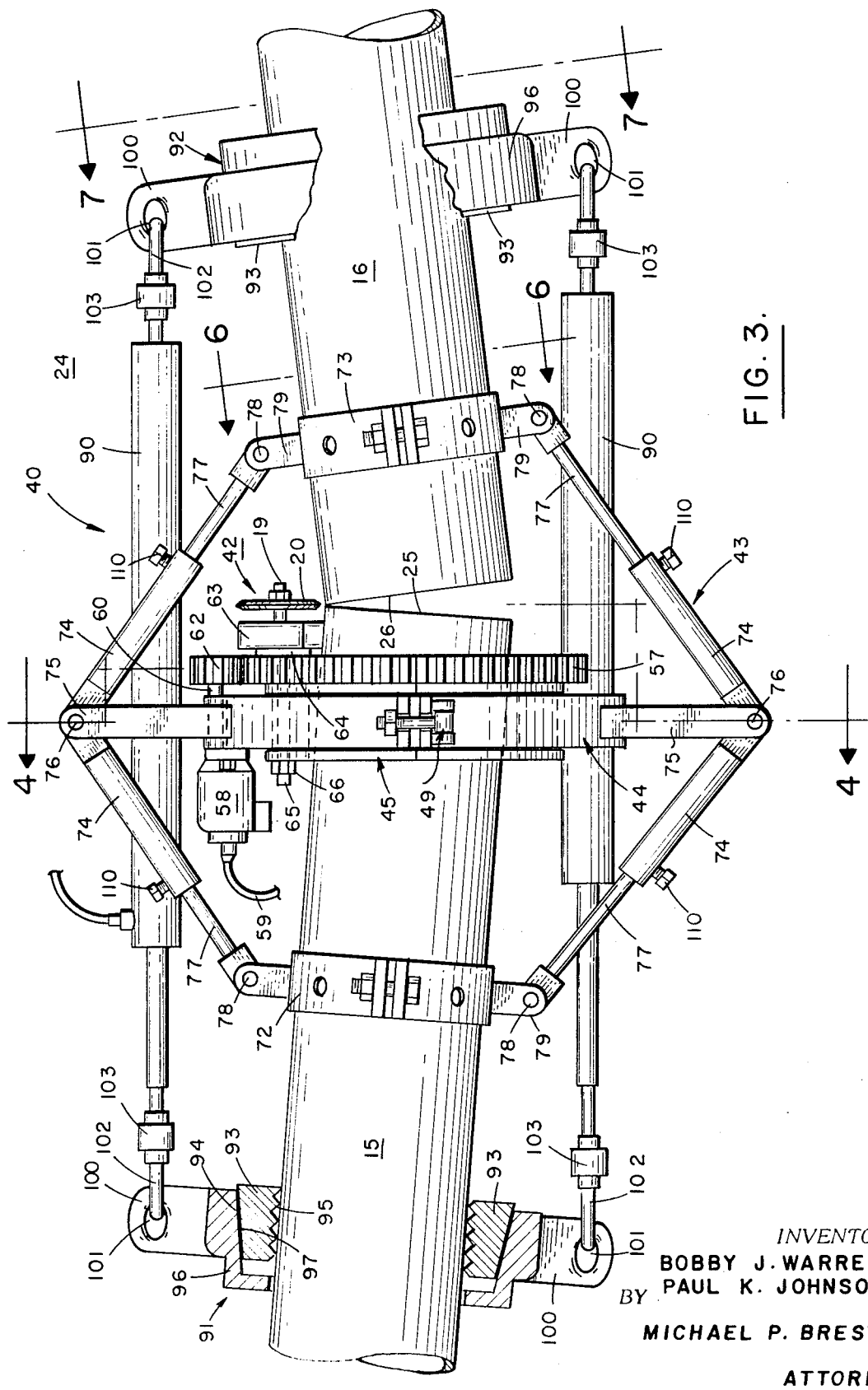

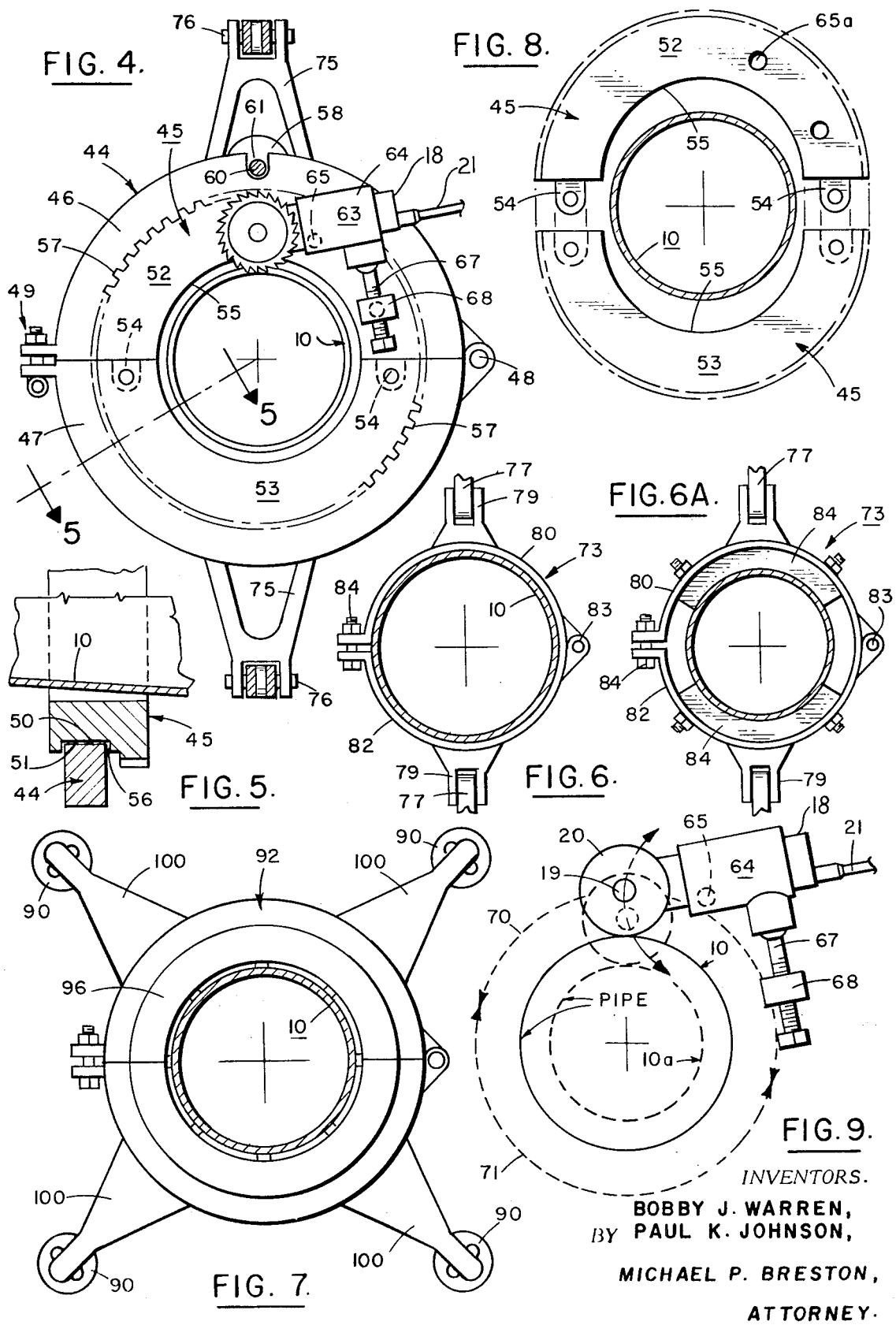

METHOD FOR PULLING, ALIGNING AND BEVELLING ADJACENT SUBMERGED PIPE SECTIONS

BACKGROUND OF THE INVENTION

In recent years the use of submarine pipelines has increased considerably. While such pipelines are intended to last for a considerable period of time, they do occasionally become damaged as a result of: natural phenomena, the pulling or dragging of man-made objects along the seabed, mud slides induced by storms and hurricanes, ordinary wear and tear, etc. The losses sustained from such accidents are considerable because there is involved not only the cost of repairing the pipeline, which in itself may amount to several hundred thousand dollars, but also the loss of income during the time the fluid flow through the line is interrupted.

The most common method of repairing an underwater line requires lifting the damaged portion of the pipe onto the deck of a nearby floating vessel or barge, replacing the damaged portion with a new pipe section, and guiding the repaired line to or near its original location on the seabed.

More recently techniques have been proposed which do not require the lifting of the damaged line onto the deck of a floating vessel. Such proposed techniques depend on lowering a complex and bulky apparatus to straddle the damaged line section, cutting out such section, and replacing it with a new pipe section. The new pipe section is cut to fit as closely as possible within the space previously occupied by the damaged pipe section. Because it is extremely difficult to fit the new pipe section into this space and to align the new pipe section with the severed portions of the pipeline, the apparatus also includes means for bending the new pipe section into place. Such bending requires high-power equipment which only adds to the cost and weight of the apparatus.

While the above-described known systems offer the advantage of eliminating the need to pull the damaged line or portions thereof onto a floating vessel, they present certain drawbacks which prevent them from becoming widely accepted. Such drawbacks include the high cost, weight and bulk of the required apparatus. Also, since the severed portions of the line seldom align as desired with the new pipe section, great difficulties are encountered in accomplishing a close alignment which will provide a welding gap of needed tolerances. The bending of the new section is a rather critical job which requires great skill and considerable time. Quite frequently the ends of the new section become ovalled in the process of bending. Frequently also the new section becomes damaged and itself must be replaced with another new section and the entire aligning process repeated.

SUMMARY OF THE INVENTION

The present invention provides a method for repairing underwater a ruptured pipeline with the use of divers and relatively light-weight and inexpensive equipment. One portion of the ruptured pipeline is pulled in abutting engagement with either the other portion of the ruptured pipeline or with a new pipe section. The abutting ends are then externally aligned, as nearly as possible, and cut simultaneously to provide bevelled edges which lie in substantially parallel planes.

The apparatus for carrying out the method of this invention includes self-adjusting gripping means, pulling means coupled between the gripping means to pull the two pipe sections end-to-end in abutting engagement, and aligning means to move one section relative to the other section to thereby obtain a gross alignment and a touching engagement between at least a portion of the edges of the adjacent pipe sections. A rotating cutting tool is made to rotate on a split guide track which is removably secured near one of the abutting ends. The cutting tool cuts both abutting ends simultaneously thereby bevelling the ends into substantially parallel planes and in face-to-face relationship as required by the welding tolerances.

BRIEF DESCRIPTION OF THE DRAWINGS

FIGS. 1 and 2 illustrate the method of this invention;

FIG. 3 is a side view in perspective of a preferred machine for carrying out the method in accordance with this invention;

FIG. 4 is a view on line 4—4 in FIG. 3;

FIG. 5 is a partial sectional view on line 5—5 in FIG. 4;

FIG. 6 is a sectional view on line 6—6 in FIG. 3;

FIG. 6A is similar to FIG. 6 and illustrates the use of the machine for different size pipes;

FIG. 7 is a sectional view on line 7—7 in FIG. 3;

FIG. 8 illustrates the manner of coupling the split rotor; and

FIG. 9 illustrates the manner of adjusting the orientation of the cutting tool for different sizes of pipes.

Referring now to FIGS. 1 and 2 of the drawings, wherein (and throughout the remaining drawings) similar parts are designated with identical reference characters, a marine pipeline 10 is shown buried in the bed 11 under a body of water 12. The terms "pipeline, pipe, and line" are used interchangeably herein and their meaning in each case will be apparent from the context.

Pipelines transporting petrochemical products are typically made of steel from pipe sections which are welded together and protected against sea corrosion with a protective coating such as concrete. Natural phenomena, dragged man-made objects, corrosion, wear and tear, etc., may cause a rupture 13 in line 10. The two severed pipe sections 15, 16 will tend to move relative to each other and away from the previous, undamaged pipeline axis in response to stresses which are locked in the pipe during the pipe-laying process.

To cut out the damaged pipe section 17 which extends a distance on either side of rupture 13, there is employed a cutting tool, such as a motor 18, having a shaft 19 to which is fixedly secured a cutter wheel 20. Motor 18 is preferably fluid-operated by a fluid line 21 and is disposed within adjustable pulling-and-aligning tools for rotation about a circular guide or track subsequently described. Motor 18 can rotate in either a clockwise or counterclockwise direction.

To avoid the entanglement of the lines leading to and from motor 18, it is made to oscillate on a semicircular path to first cut one half and then the other half of the pipe, as shown in FIG. 2. By making two complete cuts 22, 23, the defective pipe section 17 will be cut out.

If the length of the cut out section 17 is not too long, it may be possible to pull sections 15, 16 together with the pulling apparatus schematically illustrated by dotted lines 24. The adjacent ends 25, 26 of sections 15, 16 respectively, will then be in abutting engagement at least along a limited arcuate path 27. Ends 25, 26 are aligned and maintained in close contact by the aligning tool. The edges of ends 25, 26 seldom lie in substantially parallel planes and an angle alpha is formed therebetween. The magnitude of this angle is somewhat exaggerated in the drawings to better illustrate the method of this invention. In practice alpha falls within a range of a few degrees.

After ends 25, 26 abuttingly engage, cutter wheel 20 will be disposed so that its cut will be effected on both ends 25, 26 simultaneously. Preferably the line of cut should fall in a plane 28 bi-secting alpha. When cutter wheel 20 rotates, its driving motor 18 will oscillate along a fractional orbit 29 extending on either side of the engagement area 27. After the first cut is completed, ends 25 and 26 are pulled together in abutting engagement to re-establish a now more extensive contact area 27. Cutter wheel 20 is again caused to oscillate along orbit 29 to again cut both edges of ends 25 and 26 simultaneously. After the second cutting operation, pipe sections 15, 16 are again pulled together, and the process is repeated as many times as necessary until the edges of ends 25, 26 are substantially parallel to each other, face-to-face, and to within close tolerances as required by the welding operation. Thus, after several such cuts there will be established a flush fit between the severed pipe sections 15, 16 which will make it possible for a welded joint 30 to be made. Weld 30 is made in a conventional manner.

A preferred apparatus, for carrying out the above-described method of this invention, is shown in FIGS. 3 – 9, and is generally designated as 40. It includes the pulling assembly 24 for pulling the two pipe sections 15, 16 together, a bevelling machine 42 for operating cutter 20, and an aligning tool 43 for positioning machine 42 near the desired line of cut.

The bevelling machine 42 includes an outer stator ring 44 and an inner rotor ring 45 mounted for rotation inside stator ring 44.

Stator 44 comprises two semi-annular parts, 46 and 47, hingedly secured at one end by a pivot 48 and detachably secured at the diametrically opposite end by a locking device 49. When the two halves 46, 47 of stator 44 are locked together, they define an inner cylindrical surface 50 having slightly greater than an opposite mating cylindrical surface 51 of rotor 45. Surfaces 50, 51 are bearing surfaces to allow substantially free relative displacement therebetween.

Rotor 45 also comprises two semi-annular portions 52, 53 which can be locked together around the pipe's outer periphery by tongue-groove locking mechanisms 54 held together with removable pins (not shown). When the two semi-annular parts 52, 53 of rotor 45 are locked together they define an inner cylindrical surface 55 which is slightly larger than the maximum expected outer diameter pipe.

The two halves 46, 47 of stator 44 fit inside an annular groove 56 in rotor 45. Groove 56 has a rectangular cross section around the periphery of rotor 45 (See FIG. 5). Forming integral part with rotor 45 is an annular ring gear 57. To drive ring gear 57 either in a clockwise or counterclockwise direction, there is provided a reversible motor 58, preferably driven by a fluid line 59 supplied with fluid power from a source positioned on the deck of the floating vessel (not shown). Motor 58 is suitably attached to one side of stator 44 so that its shaft 60 extends through a bore 61 near the outer periphery of stator 44 (FIG. 4). Mounted on shaft 60 is a pinion gear 62 whose teeth mesh with the teeth of ring gear 57.

Adjustably supported on the flat face of rotor 45 is a cutter motor assembly 63 housing motor 18 (previously described) in a motor support housing 64 which is pivotable about a pivot shaft 65 extending through the width of rotor 45 and locked with a bolt 66 (FIG. 3). Shaft 65 extends through a bore 65a having a diameter slightly larger than the outside diameter of shaft 65 to allow shaft 65 to rotate therein. The inclination of housing 64 is adjusted with a threaded bias screw 67. Depending on the extension of bias screw 67 relative to its stationary counterpart 68, motor housing 64 and hence motor 18 will be more or less inclined relative to the periphery of pipe 10 extending through rotor 45.

In FIG. 9 are shown two pipe sizes 10 and 10a. Shaft 19 of motor 18 moves along a portion of semi-orbit 70 when rotor 45 rotates inside stator 44. To avoid the entanglement of fluid line 21, shaft 19 moves in an oscillatory motion on semi-orbit 70, i.e., when shaft 19 reaches one end of the semi-orbit 70, it reverses its direction of motion and moves to the diametrically opposite end of the semi-orbit 70. This oscillatory motion is accomplished with the reversible motor 58 through gears 62, 57.

The number of oscillatory cycles required to effect a cut will depend among other things on the sharpness of cutter wheel 20 and the thickness of the wall of pipe 10. Because the position of cutter wheel 20 relative to pipe 10 can be adjusted with the bias screw 67, various pipe sizes can be cut with the same bevelling machine 42. After a desired half cut is made along semi-orbit 70, shaft 19 will then be made to move along a diametrically opposite semi-orbit 71 in an oscillatory fashion as previously described. In this manner a full cut around pipe 10 is accomplished.

Assembly 43 for positioning and centering the bevelling machine 42 around pipe sections 15, 16, on either side of the desired line of cut, comprises two pipe clamps 72, 73, pivotably supporting a number, say four, of longitudinally adjustable cylinders 74, as best shown in FIG. 3. Extending from stator 44 are two diametrically opposite support arms 75, each supporting a pivot 76 which extends through a pair of adjacent cylinders 74. The extensible rod 77 of each cylinder 74 is rotatably mounted on a pivot 78 supported by a pair of ears 79 extending from clamps 72 and 73. Each clamp 72 or 73 consists of two half-portions 80, 82 hinged on a hinge 83 and locked by a locking mechanism 84. To accommodate different size diameter pipes with the same pair of clamps, suitable shim inserts 84 can be employed as best shown in FIG. 6A.

The pulling assembly 24 includes a number, say four, of hydraulically powered cylinders 90 supported longitudinally at their ends by a pair of slip assemblies 91, 92. Each slip assembly includes a stationary part 93 having an outer conical surface 94 and an inner surface provided with teeth 95. A movable collar 96 having an inner conical surface 97 matingly engages conical surface 94 of stationary part 93. When collar 96 is pulled over gripping part 93, teeth 95 grip the outer pipe's surface thereby preventing the sliding of the slip assemblies 91 or 92 relative to pipe 10. Each hydraulic cylinder 90 is connected to an ear 101 or an arm 100 extending from the outer periphery of collar 96. The connection is made by a rod 102 including a quick connect-disconnect mechanism 103 of conventional design to allow for the removal of cylinders 90 from the pulling assembly 24.

OPERATION OF THE APPARATUS

To mount apparatus 40 on pipe 10, rotor 45 is first assembled by coupling together parts 52 and 53. Then stator 44 is mounted on rotor 45 by locking the hingedly secured parts 46 and 47 with locking mechanism 49. The teeth of pinion gear 62 will then mesh with the teeth of ring gear 57. The bias screw 67 is adjusted to properly position the cutter wheel 20 relative to the outer periphery of pipe 10. Energizing motor 58 by pressurized fluid will cause pinion 62 and hence ring gear 57 to rotate about stator 44. The rotation of ring gear 57 and hence of rotor 45 is relatively slow, and the energization of motor 58 is such that rotor 45 and hence shaft 19 will oscillate along semi-orbit 70 or 71.

The energization of cutter motor 18 will cause the rapid rotation of its shaft 19 and hence of cutter wheel 20 which will effect the desired cut in the desired plane (for example, the bisecting plane 28 previously described in connection with FIG. 1).

The desired position of the stator-rotor assembly is obtained with the positioning cylinders 74 by adjusting the extension of their adjustable rods 77. Rods 77 can be extended outwardly or contracted inwardly, either manually with a locking screw 110 or with fluid power (not shown).

After a complete cutting operation is accomplished, the two pipe sections 15, 16 are pulled together with the pulling assembly 24 by suitably operating hydraulic cylinders 90. Another complete cut, in the manner previously described, is then accomplished. Pipe sections 15, 16 are again pulled together and the process is repeated until surfaces 25, 26 are parallel to each other to obtain a flush fit therebetween prior to the welding operation in the manner previously described.

It will be appreciated that in some instances the defective pipe portions 17 (FIG. 1 b) are too long and hence pipe sections 15, 16 cannot be pulled together. Then, a suitably dimensioned pipe insert (not shown) will be lowered from the deck of the floating vessel. The method of bevelling the ends of this pipe insert will be the same as that described, that is, this insert will be handled as pipe section 15 or 16 by the bevelling apparatus 42.

It will also be appreciated that for larger size pipes, internal lineup clamps may be desired or necessary. The use of such internal lineup clamps is known to those skilled in the art and accordingly their description is not included herein. Such internal lineup clamps provide a very fine alignment of sections 15 and 16.

While this invention has been described with reference to specific embodiments, modifications will readily suggest themselves to those skilled in the art.

What we claim is:

1. A method for working on the edges of two adjacent pipe sections lying on the bed of a body of water including the steps of:
    a. aligning the adjacent pipe sections to bring at least portions of their edges in longitudinal abutting engagement along an arcuate path; and
    b. simultaneously cutting the abutting portions of the edges to establish a close fit therebetween.

2. In the method of claim 1 repeating at least once steps (a) and (b) to make the abutting edges lie in substantially parallel planes.

3. The method of claim 2 wherein step (a) includes pulling the two pipe sections toward each other.

4. The method of claim 3 wherein step (b) includes moving a cutting tool about at least a fractional orbit extending over said arcuate path.

5. The method of claim 4 wherein step (b) includes rotating said tool while it moves about said orbit.

6. The method of claim 5 wherein step (b) includes oscillating said cutting tool about said fractional orbit.

7. The method of claim 6 wherein said abutting edges form an angle therebetween, and said orbit lies in a plane substantially bi-secting said angle.

* * * * *